(12) United States Patent
Wen et al.

(10) Patent No.: US 10,187,181 B2
(45) Date of Patent: Jan. 22, 2019

(54) METHOD AND DEVICE FOR HANDLING EXCEPTION EVENT IN TELECOMMUNICATION CLOUD

(71) Applicant: Huawei Technologies Co., Ltd., Shenzhen (CN)

(72) Inventors: Xiaoping Wen, Shenzhen (CN); Jianfeng Lai, Shenzhen (CN); Bin Qi, Shenzhen (CN); Xuanhui Chen, Shenzhen (CN); Taizhou Chen, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 71 days.

(21) Appl. No.: 15/220,116

(22) Filed: Jul. 26, 2016

(65) Prior Publication Data

US 2016/0337084 A1    Nov. 17, 2016

Related U.S. Application Data

(63) Continuation of application No. PCT/CN2015/070455, filed on Jan. 9, 2015.

(30) Foreign Application Priority Data

Jan. 27, 2014    (CN) .......................... 2014 1 0040568

(51) Int. Cl.
*H04L 1/00*    (2006.01)
*G06F 11/00*    (2006.01)
(Continued)

(52) U.S. Cl.
CPC ................ *H04L 1/08* (2013.01); *H04L 29/08* (2013.01); *H04L 41/0654* (2013.01);
(Continued)

(58) Field of Classification Search
CPC ..... H04L 1/08; H04L 29/08; H04L 29/08009; H04L 29/08018; H04L 29/08027;
(Continued)

(56) References Cited

U.S. PATENT DOCUMENTS

| | | | |
|---|---|---|---|
| 2013/0091282 A1 | 4/2013 | Tontiruttananon et al. | |
| 2016/0055045 A1* | 2/2016 | Souza ................. | G06F 11/0712 714/57 |

FOREIGN PATENT DOCUMENTS

| | | |
|---|---|---|
| CN | 102984214 A | 3/2013 |
| CN | 103294540 A | 9/2013 |
| CN | 103746855 A | 4/2014 |

OTHER PUBLICATIONS

Yu et al., "Model Analysis and Implementation Method of Deterministic Execution Replay Based on Virtual Machine," Journal of Software, vol. 23, No. 6, pp. 1620-1634 (Jun. 2012).
(Continued)

*Primary Examiner* — Bryce P Bonzo
*Assistant Examiner* — Anthony J Amoroso
(74) *Attorney, Agent, or Firm* — Leydig, Voit & Mayer, Ltd.

(57) ABSTRACT

The present invention discloses a method and a device for handling an exception event in a telecommunication cloud to shorten the notification path and increase the reliability. The method of the present invention includes: detecting a resource state; transmitting a detected resource state exception event to the application layer agent process via a failure notification channel between an infrastructure as a service (IaaS) agent process and an application layer agent process as pre-established inside a host machine Host, and/or transmitting a detected resource state exception event to the application layer management process via a failure notification channel between the IaaS agent process and an application layer management process as pre-established
(Continued)

inside the host machine Host. By means of the present invention, the notification path is shortened and the reliability is increased.

18 Claims, 9 Drawing Sheets

(51) Int. Cl.
*H04L 1/08* (2006.01)
*H04L 29/08* (2006.01)
*H04L 12/26* (2006.01)
*H04L 12/24* (2006.01)

(52) U.S. Cl.
CPC ........ *H04L 43/065* (2013.01); *H04L 43/0817* (2013.01); *H04L 67/1097* (2013.01)

(58) Field of Classification Search
CPC ......... H04L 29/08036; H04L 29/08045; H04L 29/08054; H04L 29/08063; H04L 29/08081; H04L 29/08126; H04L 29/08135; H04L 29/08144; H04L 41/0654; H04L 43/065; H04L 43/0817; H04L 43/0823; H04L 67/1097; H04L 67/08; H04L 67/10; H04L 67/42; G06F 9/455; G06F 9/45504; G06F 9/45533; G06F 9/4856; G06F 9/5077; G06F 9/5083; G06F 9/5088; G06F 2009/4557; G06F 2009/45575; G06F 2009/45595; G06F 11/1479; G06F 11/1482; G06F 11/1484; G06F 11/301; G06F 2201/815
See application file for complete search history.

(56) References Cited

OTHER PUBLICATIONS

Naibo, "Investigation of IaaS Mode," pp. 39-43, China (Aug. 20, 2011).

* cited by examiner

‎ ‎ ‎ ‎ ‎ ‎ ‎ ‎ ‎ ‎ ‎→  Failure event notification path

METHOD AND DEVICE FOR HANDLING EXCEPTION EVENT IN TELECOMMUNICATION CLOUD

CROSS-REFERENCE TO RELATED APPLICATIONS

This application is a continuation of International Patent Application No. PCT/CN2015/070455, filed Jan. 9, 2015, which claims priority to Chinese Patent Application No. 201410040568.6, filed Jan. 27, 2014, both of which are hereby incorporated by reference in their entireties.

TECHNICAL FIELD

Embodiments of the present invention relate to the field of telecommunication cloud technologies and, in particular, to a method and a device for handling an exception event in a telecommunication cloud.

BACKGROUND

With popularization of a telecommunication cloud concept, a layered architecture in which a service application layer is separated or decouple from an IaaS (Infrastructure as a Service) layer is widely applied to a telecommunication system. In the telecommunication system, hardware devices are managed by the IaaS layer, which are transparent to service applications, and the service applications generally operate in VMs (Virtual Machine), as shown in FIG. 1.

A typical characteristic of telecommunication applications is high reliability, and the high reliability is achieved in the telecommunication system by means of cooperation between a master process and a slave process. As shown in FIG. 2A, a master service process is run on VM1, and handles services; a slave service process is run on VM2, but does not handle any service. Status and data of the slave service process are synchronized from the master service process. Processes running in the system are monitored by a management process deployed on VM3, if the management process monitors that an exception occurs on a service process, then it will notify the slave service process on VM2 to convert to a master service process for handling services, whereas the master service process on VM1 converts to a slave service process, thereby achieving service restoration, as shown in FIG. 2B.

Under the layered architecture, in order to guarantee reliability of telecommunication applications over the cloud, if resource status in the IaaS layer changes, for instance, hardware is failure or a Host OS (Host Operating System, an operating system operating in a host) running VMs crashes, a related notification capability needs to be provided in the IaaS layer so as to handle an exception event, and operations such as service migration and failure isolation are completed by the IaaS layer together to provide telecommunication services of high reliability to a user.

Generally, when notify or handle an exception event notification, as shown in FIG. 3, when an IaaS agent process detects that a VM fails, the IaaS reports the failure to an IaaS management central node, the IaaS management central node then notifies an application layer management central node, and finally the application layer management central node notifies an application layer management process.

For the above process for notifying and handling the exception event notification, the channel path is relatively long, the exception event cannot be notified to the application layer in time, and the application layer management central node and the IaaS management central node, both of which are management and maintenance nodes, serve as failure notification channels, thus the reliability is relatively low.

SUMMARY

Embodiments of the present invention disclose a method and a device for handling an exception event in a telecommunication cloud to shorten the notification path and increase the reliability.

In a first aspect, a method for handling an exception event in a telecommunication cloud is provided, including:

detecting, by an infrastructure as a service IaaS agent process, a resource state;

transmitting, by the IaaS agent process, a detected resource state exception event to an application layer agent process via a failure notification channel between the IaaS agent process and the application layer agent process as pre-established inside a host machine Host, where the application layer agent process requests an application layer management process to handle the exception event according to impacts of the resource state exception event on an actual service; and/or transmitting, by the IaaS agent process, a detected resource state exception event to an application layer management process via a failure notification channel between the IaaS agent process and the application layer management process as pre-established inside the host machine Host, where the application layer management process handles the exception event according to impacts of the resource state exception event on an actual service.

With reference to the first aspect, in a first implementation, before the detecting, by the IaaS agent process, the resource state, the method further includes:

receiving, by the IaaS agent process, an exception event notification service request transmitted by an application layer management central node;

creating, by the IaaS agent process, the failure notification channel, and initiating an exception event notification service according to the exception event notification service request; and feeding back, by the IaaS agent process, an access address, an access channel type and an exchange protocol type of the exception event notification service to the application layer management central node, and instructing the application layer agent process or the application layer management process to access the exception event notification service according to the access address, the access channel type and the exchange protocol type.

With reference to the first aspect, in a second implementation, the detecting, by the IaaS agent process, the resource state includes:

receiving, by the IaaS agent process, a subscribe request transmitted by the application layer agent process or the application layer management process; and detecting, by the IaaS agent process, a resource state related to the subscribe request according to the subscribe request.

With reference to the first aspect, in a third implementation, the detecting, by the IaaS agent process, the resource state includes:

receiving, by the IaaS agent process, a subscribe request including a subscribe relationship as transmitted by the application layer management process, where the subscribe relationship is used for indicating a virtual machine to be focused by the application layer management process and the to-be-focused resource state of the virtual machine;

searching, by the IaaS agent process, an IaaS agent process to which the to-be-focused virtual machine belongs to obtain a to-be-focused IaaS agent process; and transmitting, by the IaaS agent process, the subscribe relationship to the to-be-focused IaaS agent process, and instructing the to-be-focused IaaS agent process to monitor the to-be-focused resource state of the virtual machine according to the subscribe relationship.

With reference to the third implementation of the first aspect, in a fourth implementation, the receiving, by the IaaS agent process, the subscribe request including the subscribe relationship as transmitted by the application layer management process specifically includes:

receiving, by the IaaS agent process, the subscribe request via the failure notification channel between the IaaS agent process and the application layer management process; or receiving, by the IaaS agent process, the subscribe request via a failure notification channel among the application layer management process, the application layer management central node and the IaaS agent process.

In a second aspect, a method for handling an exception event in a telecommunication cloud is provided, including:

receiving, by an application layer agent process, a resource state exception event transmitted by an infrastructure as a service IaaS agent process via a failure notification channel between the IaaS agent process and the application layer agent process as pre-established inside a host machine Host;

when impacts of the resource state exception event on an actual service reach a set level, requesting, by the application layer agent process, an application layer management process to handle the exception event.

With reference to the second aspect, in a first implementation, before the receiving, by the application layer agent process, the resource state exception event transmitted by the IaaS agent process, the method further includes:

receiving, by the application layer agent process, an access instruction transmitted by an application layer management central node, where the access instruction includes an access address, an access channel type and an exchange protocol type of an exception event notification service fed back by the IaaS agent process; and accessing, by the application layer agent process, the exception event notification service according to the access address, the access channel type and the exchange protocol type included in the access instruction.

With reference to the second aspect, in a second implementation, before the receiving, by the application layer agent process, the resource state exception event transmitted by the IaaS agent process, the method further includes:

transmitting, by the application layer agent process, a subscribe request to the IaaS agent process, and requesting the IaaS agent process to transmit a resource state related to the subscribe request.

In a third aspect, a method for handling an exception event in a telecommunication cloud is provided, including:

receiving, by an application layer management process, a resource state exception event transmitted by an infrastructure as a service IaaS agent process via a failure notification channel between the IaaS agent process and the application layer management process as pre-established inside a host machine Host;

when impacts of the resource state exception event on an actual service reach a set level, handling, by the application layer management process, the exception event.

With reference to the third aspect, in a first implementation, before the receiving, by the application layer management process, the resource state exception event transmitted by the IaaS agent process, the method further includes:

receiving an access instruction transmitted by an application layer management central node, where the access instruction includes an access address, an access channel type and an exchange protocol type of an exception event notification service fed back by the IaaS agent process; and accessing, by the application layer management process, the exception event notification service according to the access address, the access channel type and the exchange protocol type included in the access instruction.

With reference to the third aspect, in a second implementation, before the receiving, by the application layer management process, the resource state exception event transmitted by the IaaS agent process, the method further includes:

transmitting, by the application layer management process, a subscribe request to the IaaS agent process, and requesting the IaaS agent process to transmit a resource state related to the subscribe request.

With reference to the third aspect, in a third implementation, transmitting, by the application layer management process, a subscribe request including a subscribe relationship to the IaaS agent process via the failure notification channel between the IaaS agent process and the application layer management process, and requesting the IaaS agent process to transmit a to-be-focused resource state of a virtual machine, where the subscribe relationship is used for indicating the virtual machine to be focused by the application layer management process and the to-be-focused resource state of the virtual machine; or transmitting, by the application layer management process, a subscribe request including a subscribe relationship to the IaaS agent process via the failure notification channel among the application layer management process, an application layer management central node and the IaaS agent process, and requesting the IaaS agent process to transmit a to-be-focused resource state of a virtual machine, where the subscribe relationship is used for indicating the virtual machine to be focused by the application layer management process and the to-be-focused resource state of the virtual machine.

In a fourth aspect, a device for handling an exception event in a telecommunication cloud is provided, including a detecting unit and a transmitting unit, where, the detecting unit is configured to detect a resource state;

the transmitting unit is configured to transmit a resource state exception event detected by the detecting unit to an application layer agent process via a failure notification channel between an infrastructure as a service IaaS agent process and the application layer agent process as pre-established inside a host machine Host, where the application layer agent process requests an application layer management process to handle the exception event according to impacts of the resource state exception event on an actual service; and/or transmit a resource state exception event detected by the detecting unit to an application layer management process via a failure notification channel between the IaaS agent process and the application layer management process as pre-established inside the host machine Host, where the application layer management process handles the exception event according to impacts of the resource state exception event on an actual service.

With reference to the fourth aspect, in a first implementation, the transmitting unit is further configured to:

receive an exception event notification service request transmitted by an application layer management central node;

create the failure notification channel, and initiate an exception event notification service according to the exception event notification service request; and feed back an access address, an access channel type and an exchange protocol type of the exception event notification service to the application layer management central node, and instruct the application layer agent process or the application layer management process to access the exception event notification service according to the access address, the access channel type and the exchange protocol type.

With reference to the fourth aspect, in a second implementation, the detecting unit is configured to:

receive a subscribe request transmitted by the application layer agent process or the application layer management process; and detect a resource state related to the subscribe request according to the subscribe request.

With reference to the fourth aspect, in a third implementation, the detecting unit is configured to:

receive a subscribe request including a subscribe relationship as transmitted by the application layer management process, where the subscribe relationship is used for indicating a virtual machine to be focused by the application layer management process and the to-be-focused resource state of the virtual machine;

search an IaaS agent process to which the to-be-focused virtual machine belongs to obtain a to-be-focused IaaS agent process; and transmit the subscribe relationship to the to-be-focused IaaS agent process, and instruct the to-be-focused IaaS agent process to monitor the to-be-focused resource state of the virtual machine according to the subscribe relationship.

With reference to the third implementation of the fourth aspect, in a fourth implementation, the detecting unit is specifically configured to:

receive the subscribe request via the failure notification channel between the IaaS agent process and the application layer management process; or receive the subscribe request via a failure notification channel among the application layer management process, the application layer management central node and the IaaS agent process.

In a fifth aspect, a device for handling an exception event in a telecommunication cloud is provided, including a receiving unit and a requesting unit, where, the receiving unit is configured to receive a resource state exception event transmitted by an infrastructure as a service IaaS agent process via a failure notification channel between the IaaS agent process and the application layer agent process as pre-established inside a host machine Host;

the requesting unit is configured to: when impacts of the resource state exception event on an actual service reach a set level, request an application layer management process to handle the exception event.

With reference to the fifth aspect, in a first implementation, the receiving unit is further configured to:

receive an access instruction transmitted by an application layer management central node, where the access instruction includes an access address, an access channel type and an exchange protocol type of an exception event notification service fed back by the IaaS agent process; and access the exception event notification service according to the access address, the access channel type and the exchange protocol type included in the access instruction.

With reference to the fifth aspect, in a second implementation, the requesting unit is further configured to:

before receiving the resource state exception event transmitted by the IaaS agent process, transmit a subscribe request to the IaaS agent process, and request the IaaS agent process to transmit a resource state related to the subscribe request.

In a sixth aspect, a device for handling an exception event in a telecommunication cloud is provided, including a receiving unit and a handling unit, where, the receiving unit is configured to receive a resource state exception event transmitted by an infrastructure as a service IaaS agent process via a failure notification channel between the IaaS agent process and an application layer management process as pre-established inside a host machine Host; and the processing unit is configured to: when impacts of the resource state exception event on an actual service reach a set level, handle the exception event.

With reference to the sixth aspect, in a first implementation, the receiving unit is further configured to:

receive an access instruction transmitted by an application layer management central node, where the access instruction includes an access address, an access channel type and an exchange protocol type of an exception event notification service fed back by the IaaS agent process; and access the exception event notification service according to the access address, the access channel type and the exchange protocol type included in the access instruction.

With reference to the sixth aspect, in a second implementation, the device further includes a requesting unit, where, the requesting unit is configured to: before receiving the resource state exception event transmitted by the IaaS agent process, transmit a subscribe request to the IaaS agent process, and request the IaaS agent process to transmit a resource state related to the subscribe request.

With reference to the second implementation of the sixth aspect, in a third implementation, the requesting unit is configured to:

transmit a subscribe request including a subscribe relationship to the IaaS agent process via the failure notification channel between the IaaS agent process and the application layer management process, and request the IaaS agent process to transmit a to-be-focused resource state of a virtual machine, where the subscribe relationship is used for indicating the virtual machine to be focused by the application layer management process and the to-be-focused resource state of the virtual machine; or transmit a subscribe request including a subscribe relationship to the IaaS agent process via the failure notification channel among the application layer management process, an application layer management central node and the IaaS agent process, and request the IaaS agent process to transmit a to-be-focused resource state of a virtual machine, where the subscribe relationship is used for indicating a virtual machine to be focused by the application layer management process and the to-be-focused resource state of the virtual machine.

According to a method and a device for handling an exception event in a telecommunication cloud as provided in embodiments of the present invention, a detected resource state exception event is directly transmitted to an application layer agent process or an application layer management process via a failure notification channel between an IaaS agent process and an application layer agent process as pre-established inside a host machine Host or a failure notification channel between the IaaS agent process and the application layer management process, without passing through an IaaS management center and an application layer management central node, thereby shortening the notification path and increasing the reliability.

DESCRIPTION OF EMBODIMENTS

Technical solutions in embodiments of the present invention will be described hereunder clearly and completely with reference to accompanying drawings in the embodiments of the present invention. Obviously, the described embodiments are only a part of embodiments of the present invention, rather than all embodiments of the present invention. All other embodiments obtained by persons of ordinary skill in the art based on the embodiments of the present invention without any creative effort shall fall into the protection scope of the present invention.

Figure 1:
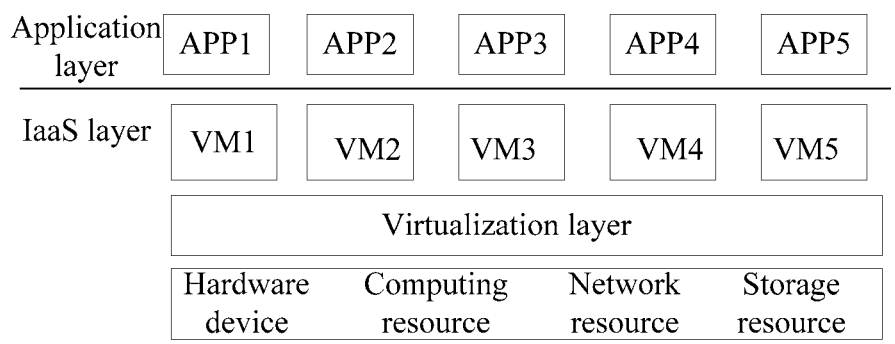
FIG. 1 is a schematic structure diagram of a telecommunication cloud layered architecture in the prior art.
Figure 2A:
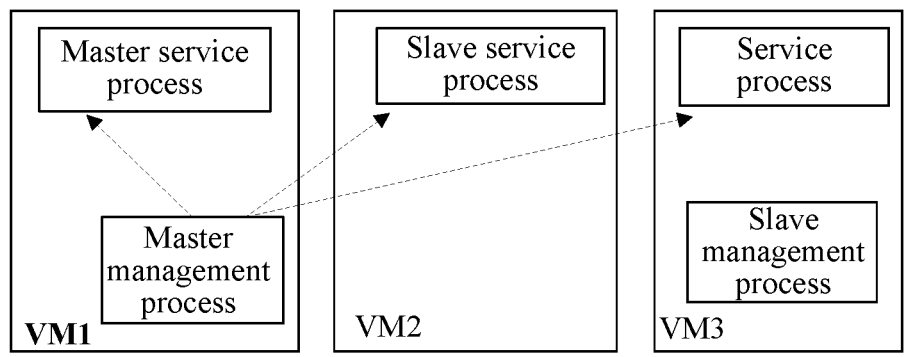
FIG. 2A-FIG. 2B are schematic diagrams of procedures for implementing service process migration in the prior art.
Figure 2B:
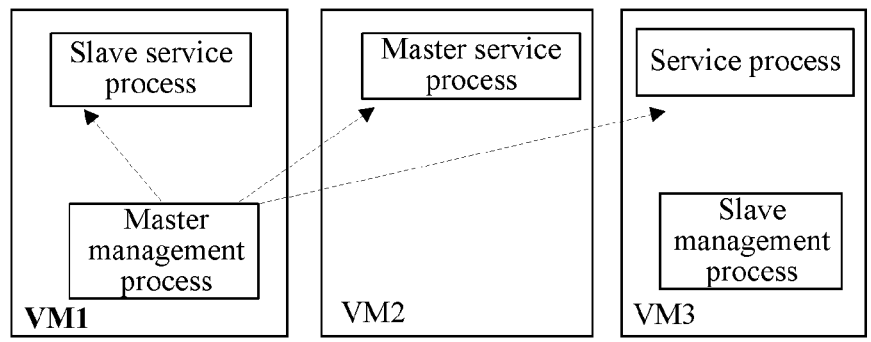
Figure 3:
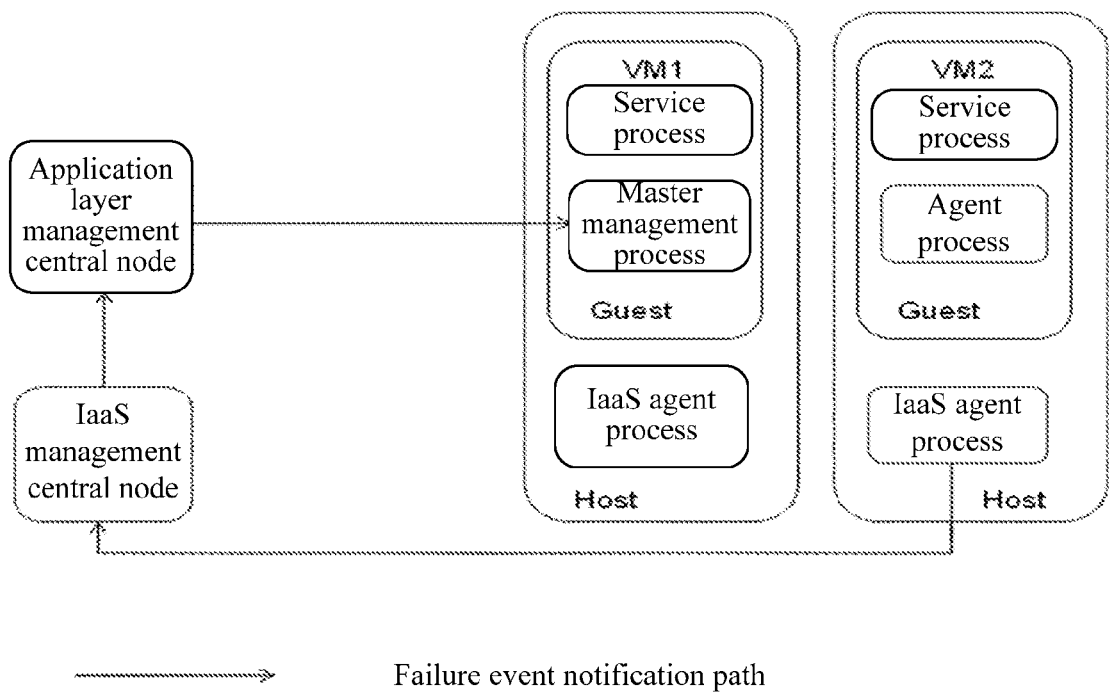
FIG. 3 is a schematic flow diagram of notifying and handling an exception event in the prior art.
Figure 4:
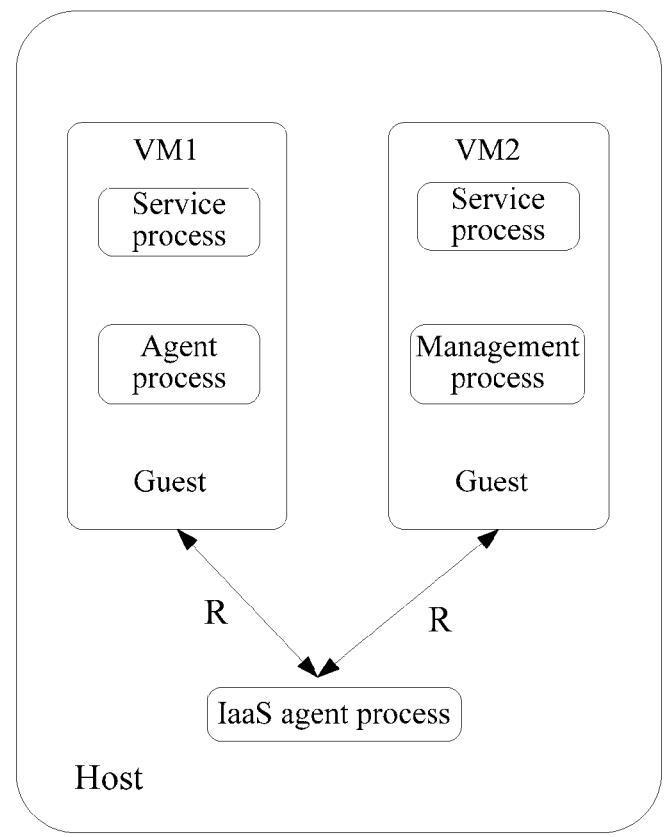
FIG. 4 is a system architecture diagram where a failure notification channel is established between a Guest and a Host according to an embodiment of the present invention.

A method for handling an exception event in a telecommunication cloud according to an embodiment of the present invention is applied in a system architecture as shown in FIG. 4, including an IaaS agent process on a Host (host machine) end, and a service process, an agent process and a management process on a Guest (client) end, where the IaaS agent process in FIG. 4 runs on the Host end, a service process and a management process on one Guest run on a virtual machine VM2 created in an IaaS layer, and a service process and an agent process on the other Guest operate on a virtual machine VM1 created in the IaaS layer, in the embodiment of the present invention, a failure notification channel R is established between a Guest and a Host, and an exception event is notified via the failure notification channel so as to shorten the notification path and increase the reliability.

Figure 5:
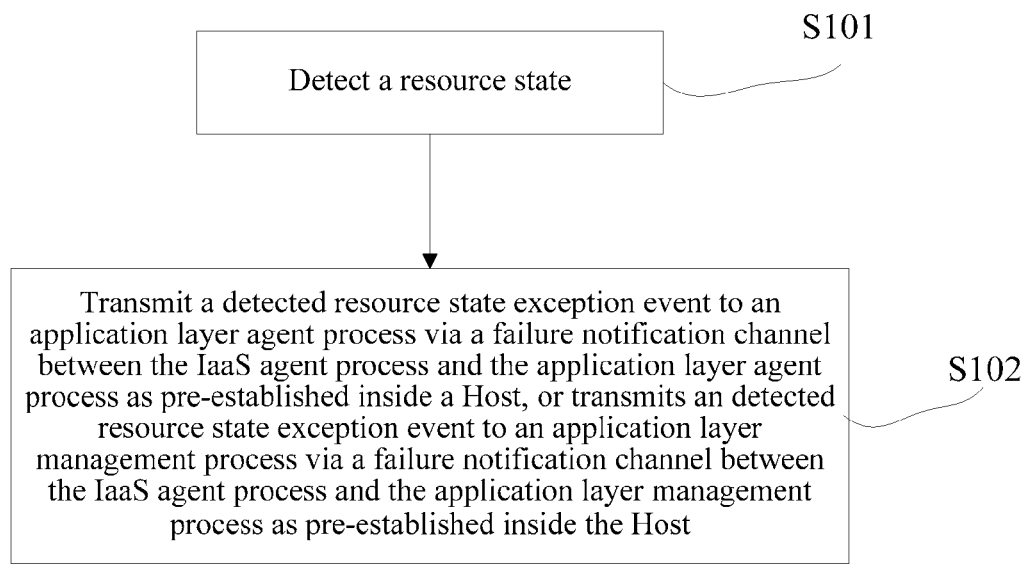
FIG. 5 is a flow chart of a procedure for notifying and handling an exception event in a telecommunication cloud according to an embodiment of the present invention.

In an embodiment, a procedure, which is executed by an IaaS agent process, for handling an exception event in a telecommunication cloud is described as an example, FIG. 5 is a flow chart of a procedure for handling an exception event in a telecommunication cloud by an IaaS, as shown in FIG. 5, including:

S101: an IaaS agent process detects a resource state.

S102: the IaaS agent process transmits a detected resource state exception event to an application layer agent process via a failure notification channel between the IaaS agent process and the application layer agent process as pre-established inside a Host, or transmits an detected resource state exception event to an application layer management process via a failure notification channel between the IaaS agent process and the application layer management process as pre-established inside the Host.

Specifically, the IaaS agent process transmits a detected resource state exception event to an application layer agent process via a failure notification channel between the IaaS agent process and the application layer agent process as pre-established inside a host machine Host, and the application layer agent process requests an application layer management process to handle the exception event, such as pause or master-to-slave shift, according to impacts of the current resource state exception event on an actual service.

The IaaS agent process transmits an detected resource state exception event to an application layer management process via a failure notification channel between the IaaS agent process and the application layer management process as pre-established inside a host machine Host, and the application layer management process handles the exception event, such as pause or master-to-slave shift, according to impacts of the current resource state exception event on an actual service.

Furthermore, in an embodiment of the present invention, before executing S101, i.e. detecting the resource state, it needs to establish a failure notification channel inside a Host in advance and initiate an exception event notification service, the procedure for establishing the failure notification channel at an IaaS side may be preferably as follow:

The IaaS agent process receives an exception event notification service request transmitted by an application layer management central node, creates the failure notification channel and initiates an exception event notification service according to the exception event notification service request. The IaaS agent process feeds back an access address, an access channel type and an exchange protocol type of the exception event notification service to the application layer management central node, and the application layer management central node instructs the application layer agent process or the application layer management process to access the exception event notification service according to the access address, the access channel type and the exchange protocol type.

Specifically, in the embodiment of the present invention, the established failure notification channel may be different types and use different protocol formats, for instance, may use the following manners to define an interface of the failure notification channel:

"directChannelType": [string] channel type, and the channel type may be "Charter device, UDP or TCP"

"directChannelName": [string] channel address, and the channel address is an access address of the exception event notification service provided by the IaaS agent process.

"directChannelProtocol": [string] channel message protocol, and the channel message protocol may be "JOSN, XML or TLV".

For instance, when a KVM (Kernel-based Virtual Machine, kernel-based virtual machine) in the Host OS creates a virtual machine, a virtio-serial (serial interface channel) is provided to a service process in a Guest, the service process in the Guest may read a character device "/dev/virtio-serial/port1", and resolve the resource state exception event transmitted by the IaaS agent process according to a JOSN format, which is implemented by using the following procedures:

```
directChannelName = /dev/virtio-serial/port1
directChannelType = charter device
directChannelProtocol = JOSN
```

Certainly, in the embodiment of the present invention, other channels may be expanded as the failure notification channel, for instance, a channel that performs the UDP/TCP via a virtual network adapter also supports other formats, such as an XML and a TLV, which may be implemented by using the following manners:

```
directChannelName = 172.168.1.6:8990
directChannelType = TCP
directChannelProtocol = TLV.
```

Furthermore, in an embodiment of the present invention, a procedure for detecting the resource state by the IaaS agent process may be preferably as follow:

A first preferred manner: the IaaS agent process receives a subscribe request transmitted by the application layer agent process or the application layer management process, and detects a resource state related to the subscribe request according to the received subscribe request.

Specifically, in embodiments of the present invention, the application layer agent process or the application layer management process may subscribe to a result event related to hardware failure, performance detection and/or reliability detection, and transmit a subscribe request including the subscriptions to the IaaS agent process, the IaaS agent process detects the resource state related to the subscribe request according to the subscribe request, and transmits a detected resource state exception event related to the subscribe request to the application layer agent process or the application layer management process, the application layer agent process or the application layer management process handle the exception event according to a specific service, for instance, a subscribe request transmitted by the application layer management process or the application layer agent process, requiring detection for virtual machine sub-health status such as high temperature of hardware and a multi-bit memory error may be received, so as to complete service migration and failure isolation when the sub-health status occurs.

Specifically, after the subscribe request transmitted by the application layer agent process or the application layer management process is received by the IaaS agent process, the detection may be implemented by defining a notification interface, where the notification interface may include the following information: an affected resource identifier (may be a plurality of objects), a notification type and a trigger event type (including a failure, performance degradation, and reliability reduction), and may be implemented by using the following procedures:

```
Content:
{
  "MessageType" : "notify",
  "object":
  {
    "objectType": "disk"
    "name" : "disk1",
    "event": "fault"
  }
}
```

A second preferred manner:

A: the IaaS agent process receives a subscribe request including a subscribe relationship as transmitted by the application layer management process, where the subscribe relationship is used for indicating a virtual machine to be focused by the application layer management process and a to-be-focused resource state of the virtual machine.

B: after receiving the subscribe request including the subscribe relationship, the IaaS agent process searches an IaaS agent process to which the to-be-focused virtual machine belongs, to obtain a to-be-focused IaaS agent process.

C: the IaaS agent process transmits the subscribe relationship to the to-be-focused IaaS agent process, and instructs the to-be-focused IaaS agent process to monitor the resource state of the to-be-focused virtual machine according to the subscribe relationship.

Specifically, when detecting that an exception occurs on the to-be-focused resource state of the virtual machine, the to-be-focused IaaS agent process transmits the resource state exception event to an IaaS agent process to which the application layer management process transmitting the subscribe request belongs, and the IaaS agent process transmits the resource state exception event to the application layer management process via the failure notification channel between the IaaS agent process and the application layer management process as pre-established inside the Host.

Figure 6A:
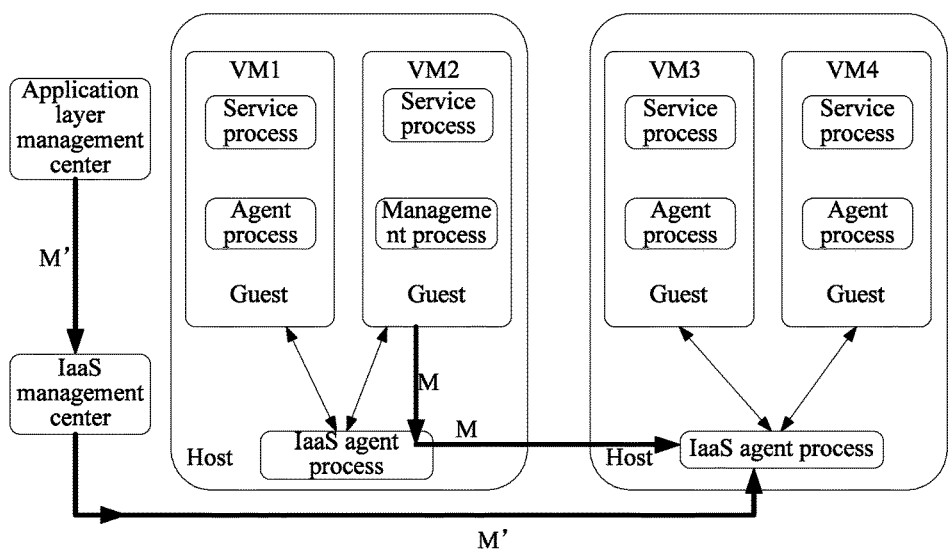
FIG. 6A-FIG. 6B are schematic diagrams of failure notification lines of an application layer management process according to embodiments of the present invention.

Preferably, in embodiments of the present invention, when receiving the subscribe request including the subscribe relationship as transmitted by the application layer management process, it may be received via the failure notification channel between the IaaS agent process and the application layer management process as pre-established inside the Host; and may also be received via the failure notification channel among the application layer management process, the application layer management central node and the IaaS agent process, as shown in FIG. 6A, the channel M represents the failure notification channel between the IaaS agent process and the application layer management process, and the channel M' represents the failure notification channel among the application layer management process, the application layer management central node and the IaaS agent process.

Figure 6B:
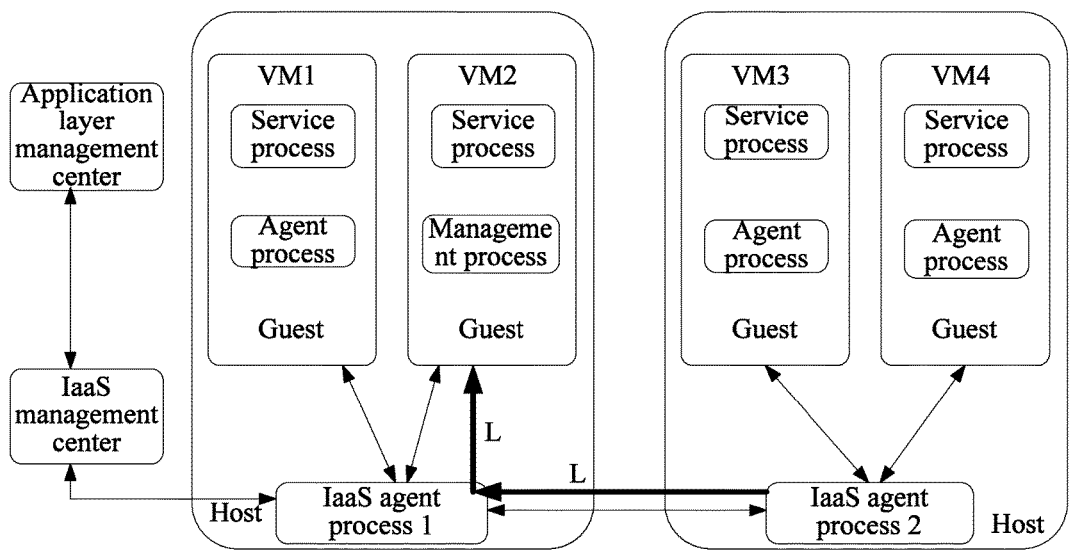

Specifically, after receiving the subscribe relationship, the to-be-focused IaaS agent process records the subscribe relationship locally, and when detecting that an exception occurs on the to-be-focused resource state of the virtual machine, or a failure operation needs to be performed for the to-be-focused virtual machine, transmits the resource state exception event to an IaaS agent process of a Host to which the application layer management process belongs according to the subscribe relationship, the IaaS agent process reports the resource state exception event to the application layer management process, and the application layer management process handles the resource state exception event of the to-be-focused virtual machine, for instance, may notify a service process in other virtual machines of taking over a service process of the to-be-focused virtual machine, as shown in FIG. 6B, L is a path through which a resource state exception event notification passes when the virtual machine fails.

For instance, as shown in FIG. 6B, an application layer management process in VM2 manages four virtual machines (VM1-VM4) simultaneously, which may subscribe to failure notification events of these four virtual machines, when IaaS agent process 2 needs to perform an operation such as restart or close to the VM4 virtual machine, or when IaaS agent process 2 directly detects that the VM4 fails, then the IaaS agent process 2 may feed back the resource state exception event to IaaS agent process 1, IaaS agent process 1 rapidly notifies the application layer management process in the VM2 via a failure notification channel as pre-established between IaaS agent process 1 and the application layer management process in the VM2, and the application layer management process in the VM2 switches a service process on the virtual machine VM4 to a normal virtual machine.

According to the method for handling an exception event in embodiments of the present invention, a detected resource state exception event is directly transmitted to an application layer agent process or an application layer management process via a pre-established failure notification channel between an IaaS agent process and the application layer management process, without passing through an IaaS management central node and an application layer management central node, thereby shortening the notification path and increasing the reliability.

Figure 7A:
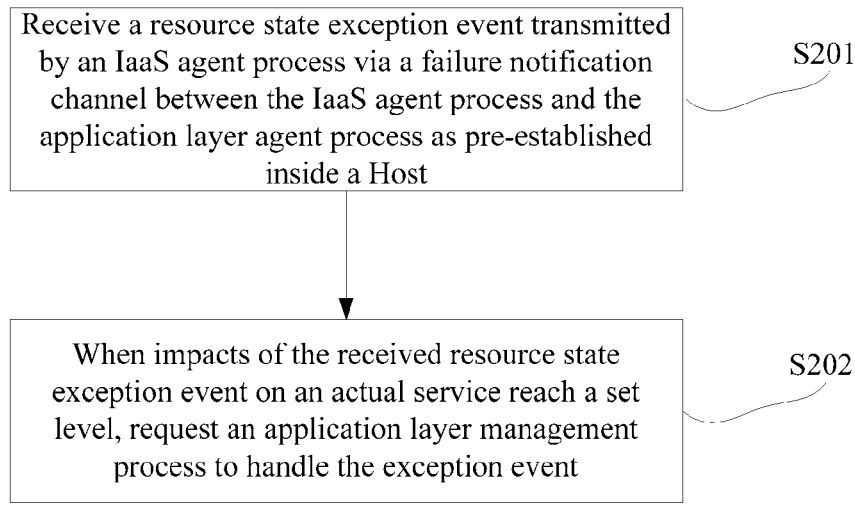
FIG. 7A-FIG. 7B are flow charts of notifying and handling an exception event by an application layer agent process according to embodiments of the present invention.

In another embodiment, a method, which is executed by an application layer agent process, for handling an exception event in a telecommunication cloud is described as an example, as shown in FIG. 7A, including:

S201: an application layer agent process receives a resource state exception event transmitted by an IaaS agent process via a failure notification channel between the IaaS agent process and the application layer agent process as pre-established inside a Host.

S202: when impacts of the received resource state exception event on an actual service reach a set level, request an application layer management process to handle the exception event.

Specifically, in the embodiment of the present invention, before receiving the resource state exception event transmitted by the IaaS agent process, the application layer agent process needs to access an exception event notification service provided by the IaaS agent process in advance, which may be implemented via the following manners preferably:

An application layer management central node transmits an exception event notification service request to the IaaS agent process, and receives an access address, an access channel type and an exchange protocol type of the exception event notification service as fed back by the IaaS agent process after the IaaS agent process creates the failure notification channel and initiates the exception event notification service, when receiving the access address, the access channel type and the exchange protocol type of the exception event notification service as fed back by the IaaS agent process, the application layer management central node transmits an access instruction to the application layer agent process, where the access instruction includes the access address, the access channel type and the exchange protocol type of the exception event notification service as fed back by the IaaS agent process, when receiving the access instruction, the application layer agent process accesses the exception event notification service according to the access address, the access channel type and the exchange protocol type included in the access instruction.

Furthermore, in the embodiment of the present invention, the application layer agent process may also transmit a subscribe request to the IaaS agent process, and requests the IaaS agent process to transmit a resource state related to the subscribe request transmitted by the application layer agent process.

Specifically, in the embodiment of the present invention, the transmitting, by the application layer agent process, the subscribe request to the IaaS agent process may be implemented through a subscribe interface, mainly through a subscribe interface object type, for instance, may be implemented by using the following procedures.

```
Content:
{
    "MessageType" : "subscribe",
    "object":
    {
        "objectType": "RAID"
    }
```

Figure 7B:
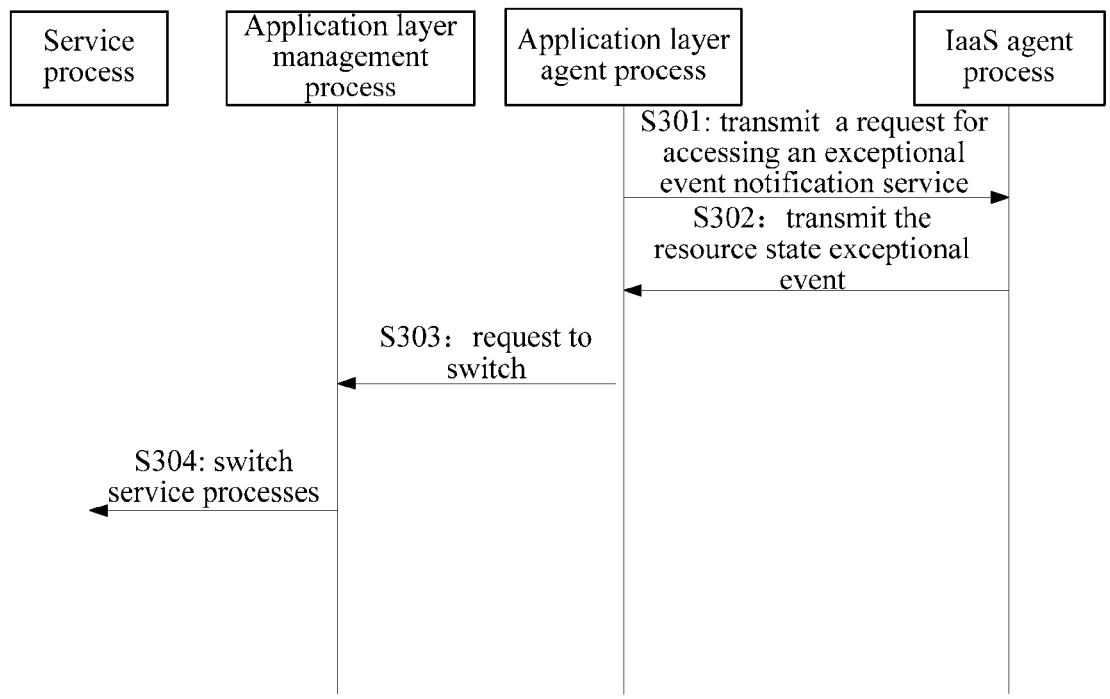

In an embodiment of the present invention, a procedure for handling an exception event by the application layer agent process is shown in FIG. 7B, including:

S301: an application layer agent process transmits a request for accessing an exception event notification service to an IaaS agent process, and accesses an exception event notification service.

Specifically, in the embodiment of the present invention, the application layer agent process may incidentally apply for the exception event notification service provided by the IaaS agent process when applying to the IaaS agent process for a virtual machine, an application layer management central node initiates an application request to the IaaS agent process, after a successful application, the IaaS agent process returns an access address, an access channel type and an exchange protocol type of the exception event notification service, and the application layer agent process accesses the exception event notification service according to the access address, the access channel type and the exchange protocol type.

S302: when detecting a resource state exception event, the IaaS agent process transmits the resource state exception event via a pre-established failure notification channel between the IaaS agent process and the application layer agent process.

S303: after receiving the resource state exception event, the application layer agent process requests an application layer management process to perform service switching according to impacts of the resource state exception event on an actual service.

S304: the application layer management process instructs a service process to perform service process switching.

According to the method for handling an exception event by an application layer agent process in the embodiment of the present invention, a detected resource state exception event is directly transmitted to the application layer agent process via a failure notification channel between an IaaS agent process and the application layer agent process as pre-established inside a Host, without passing through an IaaS management central node and an application layer management central node, thereby shortening the notification path and increasing the reliability.

Figure 8A:
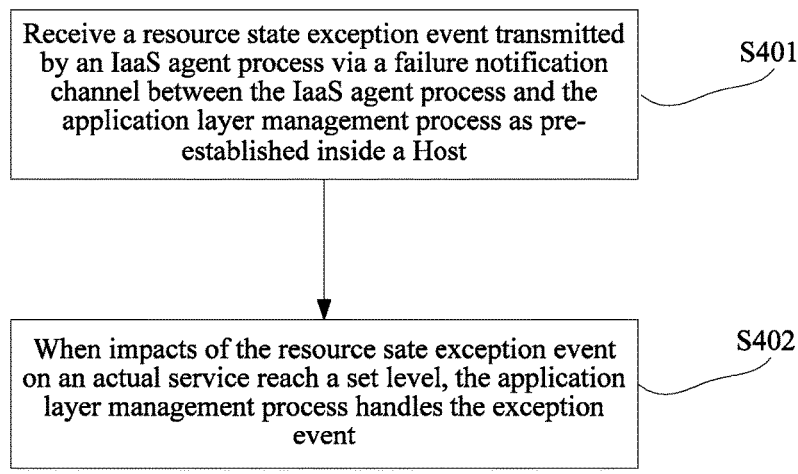
FIG. 8A-FIG. 8B are flow charts of notifying and handling an exception event by an application layer management process according to embodiments of the present invention.

In another embodiment of the present invention, a method, which is executed by an application layer management process, for handling an exception event in a telecommunication cloud is described as an example, as shown in FIG. 8A, including:

S401: an application layer management process receives a resource state exception event transmitted by an IaaS agent process via a failure notification channel between the IaaS agent process and the application layer management process as pre-established inside a Host.

S402: when impacts of the resource state exception event on an actual service reach a set level, the application layer management process handles the exception event.

Specifically, in the embodiment of the present invention, after receiving the resource state exception event transmitted by the IaaS agent process, the application layer management process may decide whether to handle the resource state exception event according to dependence of its own service on the resource, when impacts of the resource state exception event on an actual service reach a set level, the application layer management process handles the exception event. For instance, during storage of a high-level service application, when receiving an RAID degradation notification transmitted by the IaaS agent process, the application layer management process triggers an automatic switching process so as to switch a service process to a virtual machine with higher reliability before the service process is damaged, thereby reducing impacts of the RAID degradation on the service process.

Furthermore, in the embodiment of the present invention, before receiving the resource state exception event transmitted by the IaaS agent process, the application layer management process needs to access an exception event notification service provided by the IaaS agent process in advance, which may be implemented via the following manners preferably:

An application layer management central node transmits an exception event notification service request to the IaaS agent process, and receives an access address, an access channel type and an exchange protocol type of the exception event notification service as fed back by the IaaS agent process after the IaaS agent process creates the failure notification channel and initiates the exception event notification service, when receiving the access address, the access channel type and the exchange protocol type of the exception event notification service as fed back by the IaaS agent process, the application layer management central node transmits an access instruction to the application layer management process, where the access instruction includes the access address, the access channel type and the exchange protocol type of the exception event notification service as fed back by the IaaS agent process, when receiving the access instruction, the application layer management process accesses the exception event notification service according to the access address, the access channel type and the exchange protocol type included in the access instruction.

Furthermore, the application layer management process may transmit a subscribe request to the IaaS agent process, and requests the IaaS agent process to transmit a resource state related to the subscribe request.

Specifically, in the embodiment of the present invention, the transmitting, by the application layer management process, the subscribe request to the IaaS agent process may be implemented by using a same manner as that of the application layer agent process, i.e. implemented through a subscribe interface object type, which will not be repeated herein.

Furthermore, in the embodiment of the present invention, the application layer management process may transmit a subscribe request including a subscribe relationship to the IaaS agent process via the failure notification channel between the IaaS agent process and the application layer management process or the failure notification channel among the application layer management process, the application layer management central node and the IaaS agent process, and request the IaaS agent process to transmit a to-be-focused resource state of a virtual machine, where the subscribe relationship is used for indicating a virtual machine to be focused by the application layer management process and the to-be-focused resource state of the virtual machine. Reference may be made to FIG. 6A-FIG. 6B for further details.

Figure 8B:
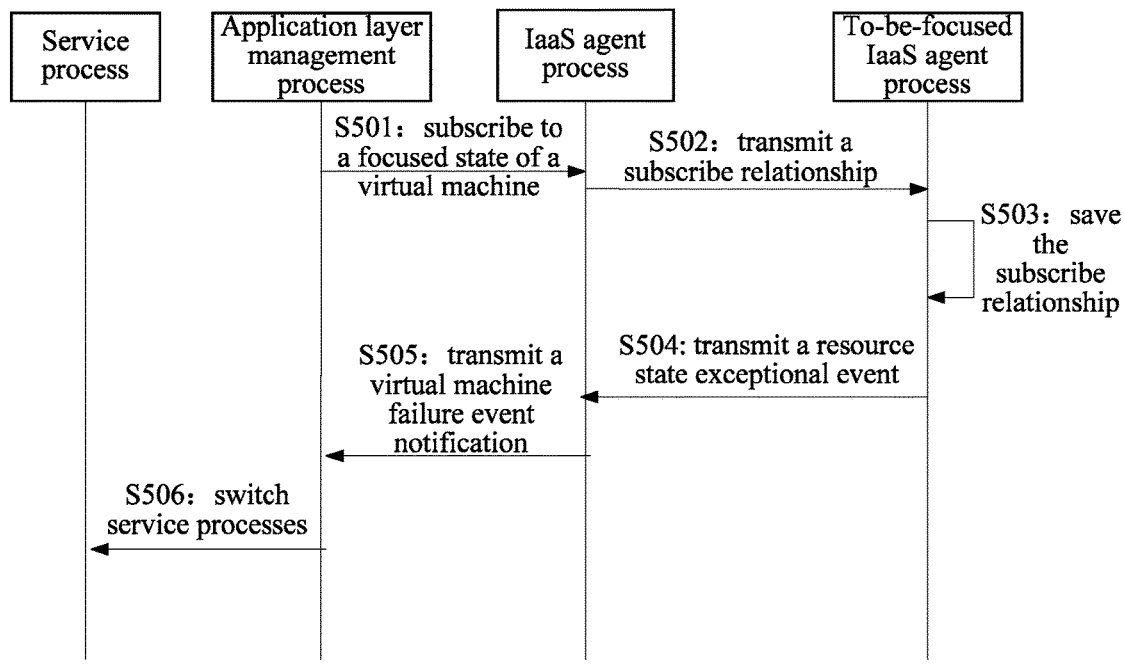

Specifically, in an embodiment of the present invention, the procedure of transmitting the subscribe request including the subscribe relationship to the IaaS agent process to obtain the resource state exception event and handle the resource state exception event by the application layer management process is shown in FIG. 8B, including:

S501: an application layer management process subscribes to a status change request of a focused virtual machine to an IaaS agent process.

S502: the IaaS agent process transmits a subscribe relationship to an IaaS agent process of a Host to which the focused virtual machine belongs, indicated as a to-be-focused IaaS agent process.

S503: the to-be-focused IaaS agent process saves the subscribe relationship.

S504: the to-be-focused IaaS agent process issues a virtual machine failure to the IaaS agent process.

S505: the IaaS agent process transmits a virtual machine failure event notification via a pre-established failure notification channel.

S506: the application layer management process instructs a service process to perform service process switching.

Certainly, the subscribe relationship of the virtual machine failure event in the application layer as described above may be transmitted to the to-be-focused IaaS agent process via another channel, that is, an application layer management central node transmits the subscribe relationship to an IaaS management central node, the IaaS management central node saves the subscribe relationship to a database, and the subscribe relationship is obtained from the IaaS management central node when the to-be-focused IaaS agent process is started.

According to the method for handling an exception event performed by an application layer management process in the embodiment of the present invention, a detected resource state exception event is directly transmitted to the application layer management process via a pre-established failure notification channel between an IaaS agent process and the application layer management process, without passing through an IaaS management central node and an application layer management central node, thereby shortening the notification path and increasing the reliability.

Figure 9:
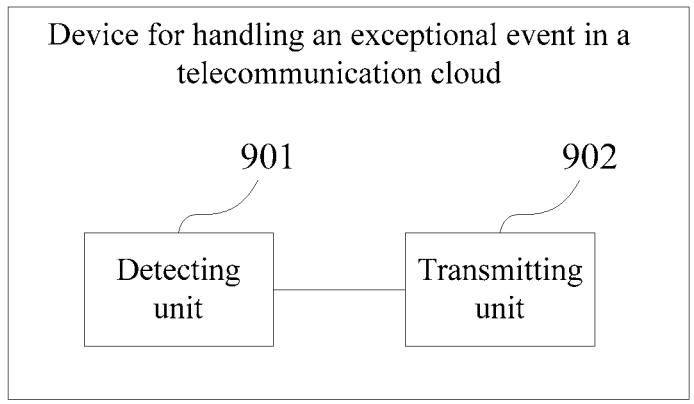
FIG. 9 is a schematic structure diagram of a device for handling an exception event in a telecommunication cloud based on an IaaS agent process according to an embodiment of the present invention.

Based on the method for handling the exception event in the telecommunication cloud performed by the IaaS agent process, an embodiment of the present invention provides a device for handling an exception event in a telecommunication cloud, as shown in FIG. 9, the device includes a detecting unit 901 and a transmitting unit 902.

The detecting unit 901 is configured to detect a resource state.

The transmitting unit 902 is configured to: transmit a resource state exception event detected by the detecting unit 901 to an application layer agent process via a failure notification channel between an IaaS agent process and the application layer agent process as pre-established inside a host machine Host, and/or transmit a resource state exception event detected by the detecting unit 901 to an application layer management process via a failure notification channel between the IaaS agent process and the application layer management process as pre-established inside the host machine Host.

In the embodiment of the present invention, the transmitting unit 902 transmits the resource state exception event detected by the detecting unit 901 to the application layer agent process via a failure notification channel between an IaaS agent process and the application layer agent process as pre-established inside a host machine Host, and the application layer agent process requests an application layer management process to handle the exception event according to impacts of the current resource state exception event on an actual service.

The transmitting unit 902 transmits the resource state exception event detected by the detecting unit 901 to an application layer management process via a failure notification channel between the IaaS agent process and the application layer management process as pre-established inside the host machine Host, and the application layer management process handles the exception event according to impacts of the current resource state exception event on an actual service.

In a first implementation, the transmitting unit 902 is further configured to:

receive an exception event notification service request transmitted by an application layer management central node;

create the failure notification channel, and initiate an exception event notification service according to the exception event notification service request; and feed back an access address, an access channel type and an exchange protocol type of the exception event notification service to the application layer management central node, and instruct the application layer agent process or the application layer management process to access the exception event notification service according to the access address, the access channel type and the exchange protocol type.

In a second implementation, the detecting unit 901 is configured to:

receive a subscribe request transmitted by the application layer agent process or the application layer management process; and detect a resource state related to the subscribe request according to the subscribe request.

In a third implementation, the detecting unit 901 is configured to:

receive a subscribe request including a subscribe relationship as transmitted by the application layer management process, where the subscribe relationship is used for indicating a virtual machine to be focused by the application layer management process and the to-be-focused resource state of the virtual machine;

search an IaaS agent process to which the to-be-focused virtual machine belongs, to obtain a to-be-focused IaaS agent process; and transmit the subscribe relationship to the to-be-focused IaaS agent process, and instruct the to-be-focused IaaS agent process to monitor the to-be-focused resource state of the virtual machine according to the subscribe relationship.

In a fourth implementation, the detecting unit 901 is specifically configured to: receive the subscribe request via the failure notification channel between the IaaS agent process and the application layer management process; or receive the subscribe request via the failure notification channel among the application layer management process, the application layer management central node and the IaaS agent process.

Figure 10:
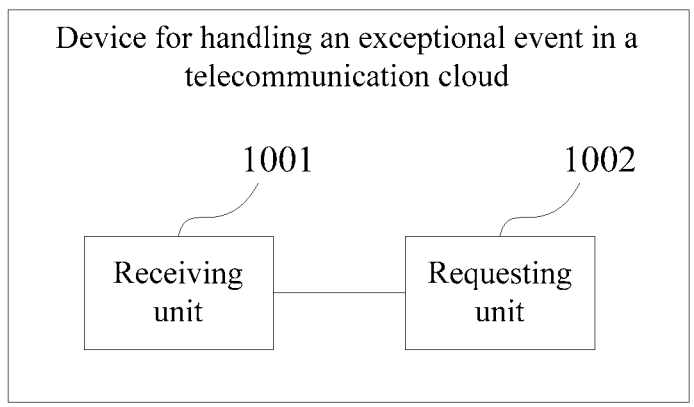
FIG. 10 is a schematic structure diagram of a device for handling an exception event in a telecommunication cloud based on an application layer agent process according to an embodiment of the present invention.

Based on the method for handling the exception event in the telecommunication cloud performed by the application layer agent process, an embodiment of the present invention provides a device for handling an exception event in a telecommunication cloud, as shown in FIG. 10, including a receiving unit 1001 and a requesting unit 1002.

The receiving unit 1001 is configured to receive a resource state exception event transmitted by an IaaS agent process via a failure notification channel between the IaaS agent process and the application layer agent process as pre-established inside a host machine Host.

The requesting unit 1002 is configured to: when impacts of the resource state exception event on an actual service reach a set level, request an application layer management process to handle the exception event.

In a first implementation, the receiving unit 1001 is further configured to:

receive an access instruction transmitted by an application layer management central node, where the access instruction includes an access address, an access channel type and an exchange protocol type of an exception event notification service fed back by the IaaS agent process; and access the exception event notification service according to the access address, the access channel type and the exchange protocol type included in the access instruction.

In a second implementation, the requesting unit 1002 is further configured to:

before receiving the resource state exception event transmitted by the IaaS agent process, transmit a subscribe request to the IaaS agent process, and request the IaaS agent process to transmit a resource state related to the subscribe request.

Figure 11A:
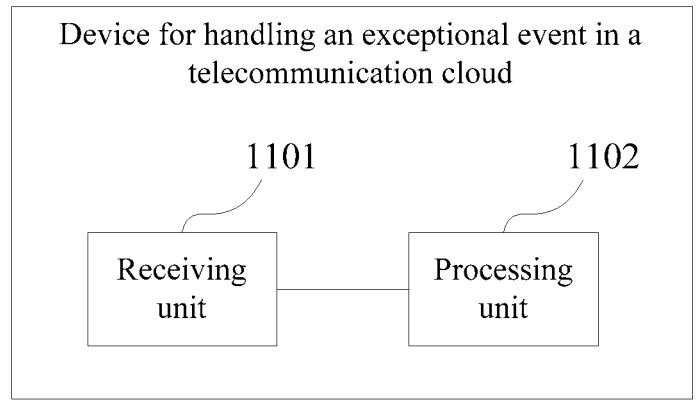
FIG. 11A-FIG. 11B are schematic structure diagrams of devices for handling an exception event in a telecommunication cloud based on an application layer management process according to embodiments of the present invention.

Based on the method for handling the exception event in the telecommunication cloud performed by the application layer management process, an embodiment of the present invention also provides a device for handling an exception event in a telecommunication cloud, as shown in FIG. 11A, the device includes a receiving unit 1101 and a processing unit 1102.

The receiving unit 1101 is configured to receive a resource state exception event transmitted by an IaaS agent process via a failure notification channel between the IaaS agent process and an application layer management process as pre-established inside a host machine Host.

The processing unit 1102 is configured to: when impacts of the resource state exception event on an actual service reach a set level, handle the exception event.

In a first implementation, the receiving unit 1102 is further configured to:

receive an access instruction transmitted by an application layer management central node, where the access instruction includes an access address, an access channel type and an exchange protocol type of an exception event notification service fed back by the IaaS agent process; and access the exception event notification service according to the access address, the access channel type and the exchange protocol type included in the access instruction.

Figure 11B:
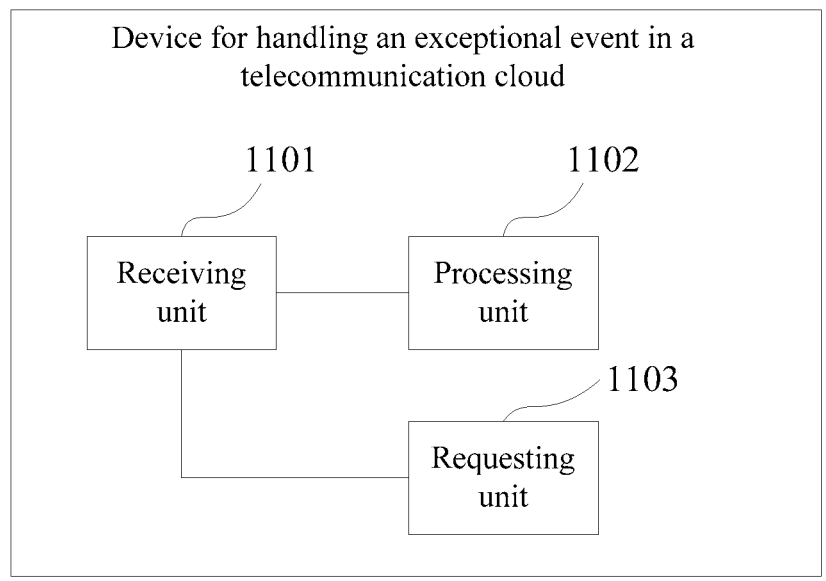

In a second implementation, the device further includes a requesting unit 1103, as shown in FIG. 11B, the requesting unit 1103 is configured to:

before receiving the resource state exception event transmitted by the IaaS agent process, transmit a subscribe request to the IaaS agent process, and request the IaaS agent process to transmit a resource state related to the subscribe request.

In a third implementation, the requesting unit 1103 is configured to:

transmit a subscribe request including a subscribe relationship to the IaaS agent process via the failure notification channel between the IaaS agent process and the application layer management process, and request the IaaS agent process to transmit a to-be-focused resource state of a virtual machine, where the subscribe relationship is used for indicating a virtual machine to be focused by the application layer management process and the to-be-focused resource state of the virtual machine; or transmit a subscribe request including a subscribe relationship to the IaaS agent process via the failure notification channel among the application layer management process, an application layer management central node and the IaaS agent process, and request the IaaS agent process to transmit a to-be-focused resource state of a virtual machine, where the subscribe relationship is used for indicating a virtual machine to be focused by the application layer management process and the to-be-focused resource state of the virtual machine.

Figure 12:
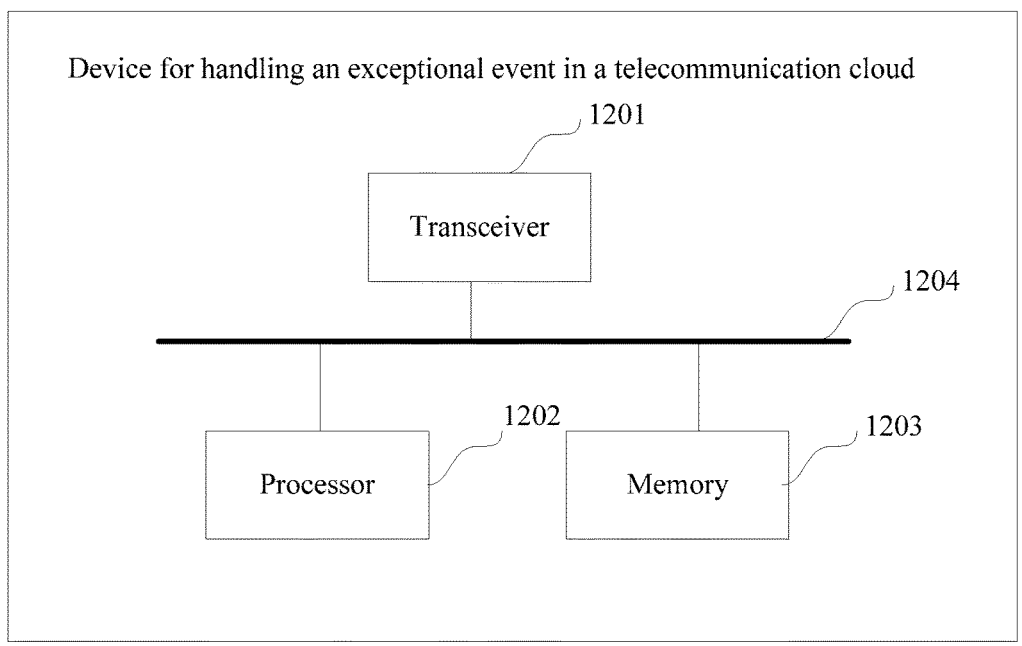
FIG. 12 is a schematic structure diagram of a device for handling an exception event in a telecommunication cloud according to an embodiment of the present invention.

Based on the device for handling the exception event in the telecommunication cloud as provided above, an embodiment of the present invention also provides another device for handling an exception event in a telecommunication cloud, as shown in FIG. 12, the device includes: a transceiver 1201, a processor 1202, a memory 1203 and a bus 1204, where the transceiver 1201, the processor 1202 and the memory 1203 are connected to the bus 1204.

The processor 1202 is configured to: detect a resource state; transmit, through the transceiver 1201, a detected resource state exception event to an application layer agent process via a failure notification channel between an IaaS agent process and the application layer agent process as pre-established inside a host machine Host, where the application layer agent process requests an application layer management process to process the exception event according to impacts of the resource state exception event on an actual service; and/or transmit a detected resource state exception event to an application layer management process via a failure notification channel between an IaaS agent process and the application layer management process as pre-established inside the host machine Host, where the application layer management process handles the exception event according to impacts of the resource state exception event on an actual service.

The processor 1202 is further configured to: receive, through the transceiver 1201, a resource state exception event transmitted by an IaaS agent process via a failure notification channel between the IaaS agent process and an application layer agent process as pre-established inside a host machine Host; when impacts of the resource state exception event on an actual service reach a set level, request an application layer management process to handle the exception event.

The processor 1202 is further configured to: receive, through the transceiver 1201, a resource state exception event transmitted by an IaaS agent process via a failure notification channel between the IaaS agent process and an application layer management process as pre-established inside a host machine Host; when impacts of the resource state exception event on an actual service reach a set level, handle the exception event.

Generally, one or more software programs controls the processor 1202 to execute the above procedures, and the one or more software programs are stored in the memory 1203, when the processor 1202 needs to execute the above procedures, the one or more software programs are called by the processor 1202, and the processor 1202 controls the software programs to complete the above procedures. Certainly, the executing, by the processor 1202, the above procedures may also be implemented via hardware, embodiments of the present invention are not limited thereto.

The devices for handling an exception event in a telecommunication cloud according to embodiments of the present invention may be used to perform the methods for handling an exception event in a telecommunication cloud as shown in FIG. 4-FIG. 8B, thus, for any description which has not been sufficiently expounded about a device for handling an exception event in a telecommunication cloud as shown in FIG. 9-FIG. 12, reference may be made to descriptions about FIG. 4-FIG. 8B.

It should be noted that, the device for handling an exception event in a telecommunication cloud according to embodiments of the present invention may be an independent component, and may also be integrated in an IaaS agent process, an application layer management process or an application layer agent process, embodiments of the present invention are not limited thereto.

According to the device for handling an exception event in a telecommunication cloud in embodiments of the present invention, a detected resource state exception event is directly transmitted to an application layer agent process or an application layer management process via a failure notification channel between an IaaS agent process and the application layer agent process as pre-established inside a Host or via a failure notification channel between an IaaS agent process and the application layer management process, without passing through an IaaS management central node and an application layer management central node, thereby shortening the notification path and increasing the reliability.

Obviously, those skilled in the art can make various modifications and variations to the present invention without departing from the spirit and the scope of the present invention. Thus, if these modifications and variations of the present invention fall into the scope of claims of the present invention and equivalent technologies thereof, then the present invention is also intended for including these modifications and variations.

What is claimed is:

1. A method for handling an exception event in a telecommunication cloud, comprising:

receiving, by an infrastructure as a service (IaaS) agent process, an exception event notification service request transmitted by an application layer management central node;

creating, by the IaaS agent process, a failure notification channel, and initiating an exception event notification service according to the exception event notification service request;

feeding back, by the IaaS agent process, an access address, an access channel type and an exchange protocol type of the exception event notification service to the application layer management central node, and instructing an application layer agent process or an application layer management process to access the exception event notification service according to the access address, the access channel type and the exchange protocol type;

detecting, by the IaaS agent process, a resource state;

transmitting, by the IaaS agent process, a detected resource state exception event to the application layer agent process via the failure notification channel between the IaaS agent process and the application layer agent process as pre-established inside a host machine (Host), wherein the application layer agent process requests the application layer management process to handle the exception event according to impacts of the resource state exception event on an actual service; and transmitting, by the IaaS agent process, the detected resource state exception event to the application layer management process via a failure notification channel between the IaaS agent process and the application layer management process as pre-established inside the Host, wherein the application layer management process handles the exception event according to impacts of the resource state exception event on an actual service.

2. The method according to claim 1, wherein, the detecting, by the IaaS agent process, the resource state comprises:
receiving, by the IaaS agent process, a subscribe request transmitted by the application layer agent process or the application layer management process; and
detecting, by the IaaS agent process, a resource state related to the subscribe request according to the subscribe request.

3. The method according to claim 1, wherein, the detecting, by the IaaS agent process, the resource state comprises:
receiving, by the IaaS agent process, a subscribe request comprising a subscribe relationship as transmitted by the application layer management process, wherein the subscribe relationship is used for indicating a virtual machine to be focused by the application layer management process and the to-be-focused resource state of the virtual machine;
searching, by the IaaS agent process, an IaaS agent process to which the to-be-focused virtual machine belongs, to obtain a to-be-focused IaaS agent process; and
transmitting, by the IaaS agent process, the subscribe relationship to the to-be-focused IaaS agent process, and instructing the to-be-focused IaaS agent process to monitor the to-be-focused resource state of the virtual machine according to the subscribe relationship.

4. The method according to claim 3, wherein, the receiving, by the IaaS agent process, the subscribe request comprising the subscribe relationship as transmitted by the application layer management process specifically comprises:
receiving, by the IaaS agent process, the subscribe request via the failure notification channel between the IaaS agent process and the application layer management process; or
receiving, by the IaaS agent process, the subscribe request via a failure notification channel among the application layer management process, the application layer management central node and the IaaS agent process.

5. A method for handling an exception event in a telecommunication cloud, comprising:
receiving, by an application layer agent process, an access instruction transmitted by an application layer management central node, wherein the access instruction comprises an access address, an access channel type and an exchange protocol type of an exception event notification service fed back by an infrastructure as a service (IaaS) agent process;
accessing, by the application layer agent process, the exception event notification service according to the access address, the access channel type and the exchange protocol type comprised in the access instruction;
receiving, by the application layer agent process, a resource state exception event transmitted the IaaS agent process via a failure notification channel between the IaaS agent process and the application layer agent process as pre-established inside a host machine (Host); and
when impacts of the resource state exception event on an actual service reach a set level, requesting, by the application layer agent process, an application layer management process to handle the exception event.

6. The method according to claim 5, wherein, before the receiving, by the application layer agent process, the resource state exception event transmitted by the IaaS agent process, the method further comprises:
transmitting, by the application layer agent process, a subscribe request to the IaaS agent process, and requesting the IaaS agent process to transmit a resource state related to the subscribe request.

7. A method for handling an exception event in a telecommunication cloud, comprising:
receiving an access instruction transmitted by an application layer management central node, wherein the access instruction comprises an access address, an access channel type and an exchange protocol type of an exception event notification service fed back by an infrastructure as a service (IaaS) agent process;
accessing, by an application layer management process, the exception event notification service according to the access address, the access channel type and the exchange protocol type comprised in the access instruction;
receiving, by the application layer management process, a resource state exception event transmitted by the IaaS agent process via a failure notification channel between the IaaS agent process and the application layer management process as pre-established inside a host machine (Host); and
when impacts of the resource state exception event on an actual service reach a set level, handling, by the application layer management process, the exception event.

8. The method according to claim 7, wherein, before the receiving, by the application layer management process, the resource state exception event transmitted by the IaaS agent process, the method further comprises:
transmitting, by the application layer management process, a subscribe request to the IaaS agent process, and requesting the IaaS agent process to transmit a resource state related to the subscribe request.

9. The method according to claim 8, wherein, the transmitting, by the application layer management process, the subscribe request to the IaaS agent process and the requesting the IaaS agent process to transmit the resource state related to the subscribe request specifically comprise:

transmitting, by the application layer management process, a subscribe request comprising a subscribe relationship to the IaaS agent process via the failure notification channel between the IaaS agent process and the application layer management process, and requesting the IaaS agent process to transmit a to-be-focused resource state of a virtual machine, wherein the subscribe relationship is used for indicating the virtual machine to be focused by the application layer management process and the to-be-focused resource state of the virtual machine; or transmitting, by the application layer management process, a subscribe request comprising a subscribe relationship to the IaaS agent process via the failure notification channel among the application layer management process, an application layer management central node and the IaaS agent process, and requesting the IaaS agent process to transmit a to-be-focused resource state of a virtual machine, wherein the subscribe relationship is used for indicating the virtual machine to be focused by the application layer management process and the to-be-focused resource state of the virtual machine.

10. A device for handling an exception event in a telecommunication cloud, comprising a processor and a non-transitory computer readable medium having a plurality of computer readable instructions stored thereon that, when executed by the processor, cause the processor to implement:

receiving an exception event notification service request transmitted by an application layer management central node;

creating a failure notification channel, and initiating an exception event notification service according to the exception event notification service request;

feeding back an access address, an access channel type and an exchange protocol type of the exception event notification service to the application layer management central node, and instructing an application layer agent process or an application layer management process to access the exception event notification service according to the access address, the access channel type and the exchange protocol type;

detecting a resource state;

transmitting a resource state exception event to the application layer agent process via a failure notification channel between an infrastructure as a service (IaaS) agent process and the application layer agent process as pre-established inside a host machine (Host), wherein the application layer agent process requests the application layer management process to handle the exception event according to impacts of the resource state exception event on an actual service; and transmitting the resource state exception event to an application layer management process via the failure notification channel between the IaaS agent process and the application layer management process as pre-established inside the Host, wherein the application layer management process handles the exception event according to impacts of the resource state exception event on the actual service.

11. The device according to claim 10, wherein, the detecting the resource state comprises:

receiving a subscribe request transmitted by the application layer agent process or the application layer management process; and detect a resource state related to the subscribe request according to the subscribe request.

12. The device according to claim 11, wherein, the detecting the resource state comprises:

receiving a subscribe request comprising a subscribe relationship as transmitted by the application layer management process, wherein the subscribe relationship is used for indicating a virtual machine to be focused by the application layer management process and the to-be-focused resource state of the virtual machine;

searching an IaaS agent process to which the to-be-focused virtual machine belongs to obtain a to-be-focused IaaS agent process; and transmitting the subscribe relationship to the to-be-focused IaaS agent process, and instruct the to-be-focused IaaS agent process to monitor the to-be-focused resource state of the virtual machine according to the subscribe relationship.

13. The device according to claim 12, wherein, the receiving the subscribe request comprising the subscribe relationship as transmitted by the application layer management process specifically comprises:

receiving the subscribe request via the failure notification channel between the IaaS agent process and the application layer management process; or receiving the subscribe request via a failure notification channel among the application layer management process, the application layer management central node and the IaaS agent process.

14. A device for handling an exception event in a telecommunication cloud, comprising a processor and a non-transitory computer readable medium having a plurality of computer readable instructions stored thereon that, when executed by the processor, cause the processor to implement:

receiving an access instruction transmitted by an application layer management central node, wherein the access instruction comprises an access address, an access channel type and an exchange protocol type of an exception event notification service fed back by an infrastructure as a service (IaaS) agent process; and accessing the exception event notification service according to the access address, the access channel type and the exchange protocol type comprised in the access instruction;

receiving a resource state exception event transmitted by the IaaS agent process via a failure notification channel between the IaaS agent process and an application layer agent process as pre-established inside a host machine (Host); and when impacts of the resource state exception event on an actual service reach a set level, requesting an application layer management process to handle the exception event.

15. The device according to claim 14, wherein, when executed by the processor, the plurality of computer readable instructions further cause the processor to implement:

before receiving the resource state exception event transmitted by the IaaS agent process, transmitting a subscribe request to the IaaS agent process, and requesting the IaaS agent process to transmit a resource state related to the subscribe request.

16. A device for handling an exception event in a telecommunication cloud, comprising a processor and a non-transitory computer readable medium having a plurality of computer readable instructions stored thereon that, when executed by the processor, cause the processor to implement:
- receiving an access instruction transmitted by an application layer management central node, wherein the access instruction comprises an access address, an access channel type and an exchange protocol type of an exception event notification service fed back by an infrastructure as a service (IaaS) agent process; and accessing the exception event notification service according to the access address, the access channel type and the exchange protocol type comprised in the access instruction;
- receiving a resource state exception event transmitted by the IaaS agent process via a failure notification channel between the IaaS agent process and an application layer management process as pre-established inside a host machine (Host); and
- when impacts of the resource state exception event on an actual service reach a set level, handling the exception event.

17. The device according to claim 16, wherein, when executed by the processor, the plurality of computer readable instructions further cause the processor to implement:
- before receiving the resource state exception event transmitted by the IaaS agent process, transmitting a subscribe request to the IaaS agent process, and requesting the IaaS agent process to transmit a resource state related to the subscribe request.

18. The device according to claim 17, wherein, the transmitting the subscribe request to the IaaS agent process and the requesting the IaaS agent process to transmit the resource state related to the subscribe request specifically comprise:
- transmitting a subscribe request comprising a subscribe relationship to the IaaS agent process via the failure notification channel between the IaaS agent process and the application layer management process, and requesting the IaaS agent process to transmit a to-be-focused resource state of a virtual machine, wherein the subscribe relationship is used for indicating the virtual machine to be focused by the application layer management process and the to-be-focused resource state of the virtual machine; or
- transmitting a subscribe request comprising a subscribe relationship to the IaaS agent process via the failure notification channel among the application layer management process, an application layer management central node and the IaaS agent process, and requesting the IaaS agent process to transmit a to-be-focused resource state of a virtual machine, wherein the subscribe relationship is used for indicating a virtual machine to be focused by the application layer management process and the to-be-focused resource state of the virtual machine.

* * * * *